US009163684B2

(12) United States Patent
Hong et al.

(10) Patent No.: US 9,163,684 B2
(45) Date of Patent: Oct. 20, 2015

(54) DISC BRAKE

(71) Applicant: MANDO CORPORATION, Pyeongtaek-si, Gyeonggi-do (KR)

(72) Inventors: Seon-ki Hong, Seoul (KR); Young-hun Kong, Gunpo-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 14/304,790

(22) Filed: Jun. 13, 2014

(65) Prior Publication Data

US 2015/0053511 A1    Feb. 26, 2015

(30) Foreign Application Priority Data

Aug. 26, 2013 (KR) .................. 10-2013-0100786

(51) Int. Cl.
*F16D 65/56* (2006.01)
*F16D 65/54* (2006.01)

(52) U.S. Cl.
CPC .............. *F16D 65/543* (2013.01); *F16D 65/56* (2013.01); *F16D 65/567* (2013.01)

(58) Field of Classification Search
CPC ...... F16D 65/56; F16D 65/567; F16D 65/543
USPC ..................... 188/71.7, 71.8, 71.9, 72.4, 72.6
See application file for complete search history.

(56) References Cited

U.S. PATENT DOCUMENTS

| | | | | |
|---|---|---|---|---|
| 4,378,863 A * | 4/1983 | Baum | .......................... | 188/71.8 |
| 4,433,758 A * | 2/1984 | Crossman | ................. | 188/196 R |
| 4,784,245 A * | 11/1988 | Fabbro et al. | ............. | 188/196 D |
| 5,868,225 A * | 2/1999 | Hulliger | ........................ | 188/72.4 |
| 6,478,120 B2 * | 11/2002 | Runkel et al. | ................. | 188/71.9 |
| 6,651,784 B1 * | 11/2003 | Barbosa et al. | ............. | 188/71.9 |
| 6,749,044 B2 * | 6/2004 | Boisseau | ..................... | 188/72.7 |
| 6,811,002 B2 * | 11/2004 | Nakayama et al. | .......... | 188/71.9 |

(Continued)

FOREIGN PATENT DOCUMENTS

DE          44 17 741  A1 *  11/1995  .............. F16D 65/56

*Primary Examiner* — Thomas Irvin
(74) *Attorney, Agent, or Firm* — McDermott Will & Emery LLP (57) ABSTRACT

Disclosed is a disc brake including a carrier on which a pair of pad plates are movably installed and a caliper housing, which is slidably installed on the carrier and is provided with a cylinder having a piston mounted so as to move forward and backward by a hydraulic braking pressure, the disc brake including: an adjuster installed in the piston to prevent the pad plates from moving away from a disc and to maintain the pad plates at a constant distance from the disc; a push rod installed in the cylinder, a front portion thereof being screw-coupled to the adjuster and a rear portion thereof being provided with a flange extending toward an inner circumferential surface of the cylinder; a ramp unit into which the rear portion of the push rod is inserted and which is installed in the cylinder and compresses the push rod toward the piston in cooperation with a parking cable to prevent rotation of the push rod; a spring case having an end portion of one side thereof fixed to the cylinder and forming a predetermined accommodation space between the inner circumferential surface of the cylinder and the push rod; a first elastic member and a second elastic member arranged in series with each other in the accommodation space of the spring case to provide elastic force to the push rod; and a support plate supported by an end portion of the ramp unit and interposed between the first elastic member and the second elastic member.

8 Claims, 5 Drawing Sheets

(56) References Cited

U.S. PATENT DOCUMENTS

| | | | |
|---|---|---|---|
| 7,331,432 B2 * | 2/2008 | Watada | 188/72.7 |
| 7,523,815 B2 * | 4/2009 | Petri et al. | 188/71.9 |
| 8,069,961 B2 * | 12/2011 | Watada | 188/72.8 |
| 8,177,038 B2 * | 5/2012 | Watada et al. | 188/72.8 |
| 8,668,057 B2 * | 3/2014 | Kim | 188/72.9 |
| 8,881,874 B2 * | 11/2014 | Kong | 188/71.8 |
| 8,973,718 B2 * | 3/2015 | Kong et al. | 188/72.8 |
| 2011/0155520 A1 | 6/2011 | Takahashi et al. | |
| 2012/0292137 A1 * | 11/2012 | Yoshikawa et al. | 188/71.7 |
| 2014/0020989 A1 * | 1/2014 | Hong et al. | 188/72.3 |
| 2015/0053512 A1 * | 2/2015 | Lee et al. | 188/72.3 |

* cited by examiner

DISC BRAKE

CROSS-REFERENCE TO RELATED APPLICATIONS

This application claims the benefit of Korean Patent Application No. 2013-0100786, filed on Aug. 26, 2013 in the Korean Intellectual Property Office, the disclosure of which is incorporated herein by reference.

BACKGROUND

1. Field

Embodiments of the present invention relate to a disc brake, and more particularly, to a disc brake capable of stably returning a piston after a braking operation is terminated while improving the effect of return of a piston.

2. Description of the Related Art

A disc brake is an apparatus for braking a vehicle by forcedly causing friction pads to be pressed against both sides of a disc that rotates together with a wheel of the vehicle to stop the disc rotating. In the disc brake, a parking brake configured to keep a vehicle stationary is used at the time of parking.

In general, a disc brake includes one pair of pad plates disposed at both sides of a disc that rotates with a wheel of a vehicle and compress the disc to generate a braking force, a carrier supporting the pad plates, a caliper housing slidably installed on the carrier to compress the pad plates and equipped with a piston moved by hydraulic braking pressure, and an actuator configured to operate the piston in a mechanical manner.

The actuator is connected to a parking cable for operating the actuator, and the parking cable is manually or automatically operated by being connected to a parking cable manipulating apparatus that is operated by a parking lever directly manipulated by a driveror an electro motive apparatus.

There are two types of actuating. One is a cam-strut actuating that uses a cam rotated by operation of a parking cable and a strut installed between the cam and a piston. The other is a ball-in-ramp actuating that includes a fixed ramp plate fixedly installed in a caliber housing, a rotating ramp plate rotated by operation of a parking cable, a ball installed between the fixed ramp plate and the rotating ramp plate to advance the rotating ramp plate at the time of rotation of the rotating ramp plate, a push rod provided adjacent to the rotating ramp plate to push a piston, and a spring returning the push rod to the original position thereof.

In general, the ball-in-ramp scheme is referred to as a BIR (ball-in-ram) caliper type, and BIR caliper type disc brake is disclosed in Korean Patent Publication No. 10-2011-0029267. According to the disclosure, a rotating ramp plate pushes a push rod by rotating and advancing, and the push rod pushes a piston such that disc pads come into close contact with a disc.

The BIR caliper type disc brake does not have a subsidiary member securing a predetermined running clearance between a disc and pad plates in the initial braking, which causes friction pads installed on the pad plate to unnecessarily make friction with the disc, leading to abrasion of the friction pads and noise resulting therefrom. In addition, a short restoring distance at the time of releasing the brake leads to a drag in which the friction pads are not sufficiently separated from the disc and thus the friction pads are worn out.

PRIORITY ART DOCUMENTS

Korean Patent Publication No. 10-2011-0029267 (Mando Corporation), dated Mar. 23, 2011.

SUMMARY

Therefore, it is an aspect of the present invention to provide a disc brake capable of improving the effect of return of a piston and preventing a drag when a braking operation is terminated by providing a low-pressure spring and a high-pressure spring configured to operate at a low pressure and a high pressure, respectively, at the time of braking, and also securing a predetermined clearance between a disc and friction pads by forming a gap between a spring elastically pressing a push rod and the push rod.

It is another aspect of the present invention to provide a disc brake used for a compact sized BIR caliper type disc brake while having a low-pressure spring and a high-pressure spring disposed in series with each other, and capable of minimizing the overall length thereof.

Additional aspects of the invention will be set forth in part in the description which follows and, in part, will be obvious from the description, or may be learned by practice of the invention.

In accordance with one aspect of the present invention, a disc brake including a carrier on which a pair of pad plates are movably installed and a caliper housing, which is slidably installed on the carrier and is provided with a cylinder having a piston mounted so as to move forward and backward by a hydraulic braking pressure, the disc brake including: an adjuster installed in the piston to prevent the pad plates from moving away from a disc and to maintain the pad plates at a constant distance from the disc; a push rod installed in the cylinder, a front portion thereof being screw-coupled to the adjuster and a rear portion thereof being provided with a flange extending toward an inner circumferential surface of the cylinder; a ramp unit into which the rear portion of the push rod is inserted and which is installed in the cylinder and compresses the push rod toward the piston in cooperation with a parking cable to prevent rotation of the push rod; a spring case having an end portion of one side thereof fixed to the cylinder and forming a predetermined accommodation space between the inner circumferential surface of the cylinder and the push rod; a first elastic member and a second elastic member arranged in series with each other in the accommodation space of the spring case to provide elastic force to the push rod; and a support plate supported by an end portion of the ramp unit and interposed between the first elastic member and the second elastic member.

The ramp unit may include a fixed ramp plate provided in a cylindrical shape, a front portion of which is open, and is fixedly installed on the cylinder, a rotating ramp plate provided in the fixed ramp plate and passing through a rear portion of the fixed ramp plate and a rear portion of the cylinder, to rotate by receivinga rotatory force of an operating lever connected to the parking cable, and a plurality of balls interposed between the fixed ramp plate and the rotating ramp plate to advance the rotating ramp plate at the time of rotation of the rotating ramp plate.

The fixed ramp plate may be provided at the rear portion thereof with a rotation preventing protrusion that protrudes outward; and a rotation preventing groove corresponding to the rotation preventing protrusion is formed at a position in the cylinder corresponding to the rotation preventing protrusion.

The push rod may be provided with a plurality of coupling protrusions protruding outward and equally spaced along an outer circumferential surface of the flange; and the fixed ramp plate is provided at a position of an inner circumferential surface thereof corresponding to the coupling protrusions with coupling grooves assembled to the coupling protrusions to prevent rotation of the push rod.

The support plate may be supported by being seated and supported on a seating groove that is recessed inward at a leading end surface of a front side of the fixed ramp plate; and a leading end surface of the seating groove is formed ahead of a leading end surface of a flange in an advancing direction of the piston to form a step between the leading end surface of the flange and the leading end surface of the seating groove, thereby forming a gap in a longitudinal direction between the support plate and the flange.

The first elastic member may include a low-pressure spring having one end supported by the support plate and the other end supported by the flange to provide an elastic force in a movement direction of the piston; and the second elastic member includes a high-pressure spring having one end supported by the other side of the spring case and the other end supported by the support plate to provide an elastic force in a movement direction of the piston, wherein the high-pressure spring may have an elastic force greater than an elastic force of the lower pressure spring.

The first elastic member may include a wave spring or a disc spring.

The adjuster may be provided with a head portion making contact with the piston and a rod extending rearward from the head portion and provided at an outer circumferential surface thereof with a thread that is screw-coupled to the push rod; and washers may be installed on a rear wall of the head portion of the adjuster and an inner side surface of the piston, respectively, and a washer spring may be provided between the washers such that the adjuster comes into close contact with the piston by an elastic force of the washer spring.

As is apparent from the above, a low-pressure spring and a high-pressure operating at a lower pressure and a high pressure at the time of braking, respectively, are provided to move the piston backward, thereby preventing a drag. In addition, a support plate interposed between a high-pressure spring and a low-pressure spring is provided to have a gap with respect to a push rod, so that a predetermined distance between a disc and pad plates is secured, thereby preventing the friction pads from unnecessarily making friction with the disc and being worn out, and noise resulting therefrom, and also providing smooth braking force.

In addition, the low-pressure spring and the high-pressure spring are disposed in series with each other, so as to be combined to a small BIR disc brake. In addition, a low-pressure spring is provided using a wave spring or a disc spring, and thus the overall length of the disc brake is minimized.

In addition, the initial brake feel is prevented from being dropped off due to increase in the amount of roll-back according to wear of the friction pads which are pressed against the disc.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the preferred embodiments of the present invention, examples of which are illustrated in the accompanying drawings. These embodiments are provided so that this disclosure will be thorough and complete, and will fully convey the spirit and scope of the present invention to those skilled in the art. Other embodiments may also be provided. Constituent elements other than elements constituting essential features of the present invention may be omitted from the drawings, for clarity of description. In the drawings, the widths, lengths, and thicknesses of constituent elements may be exaggerated for clarity and convenience of illustration. Like reference numerals refer to like elements throughout.

Figure 1:
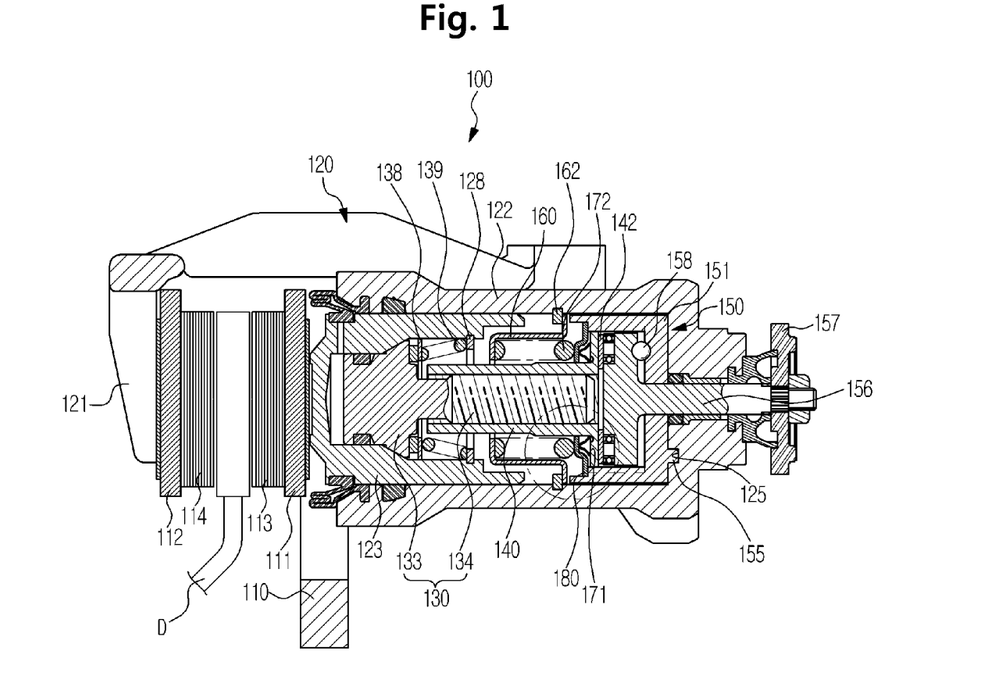
FIG. 1 is a cross-sectional view illustrating a disc brake according to an embodiment of the present invention.
Figure 2:
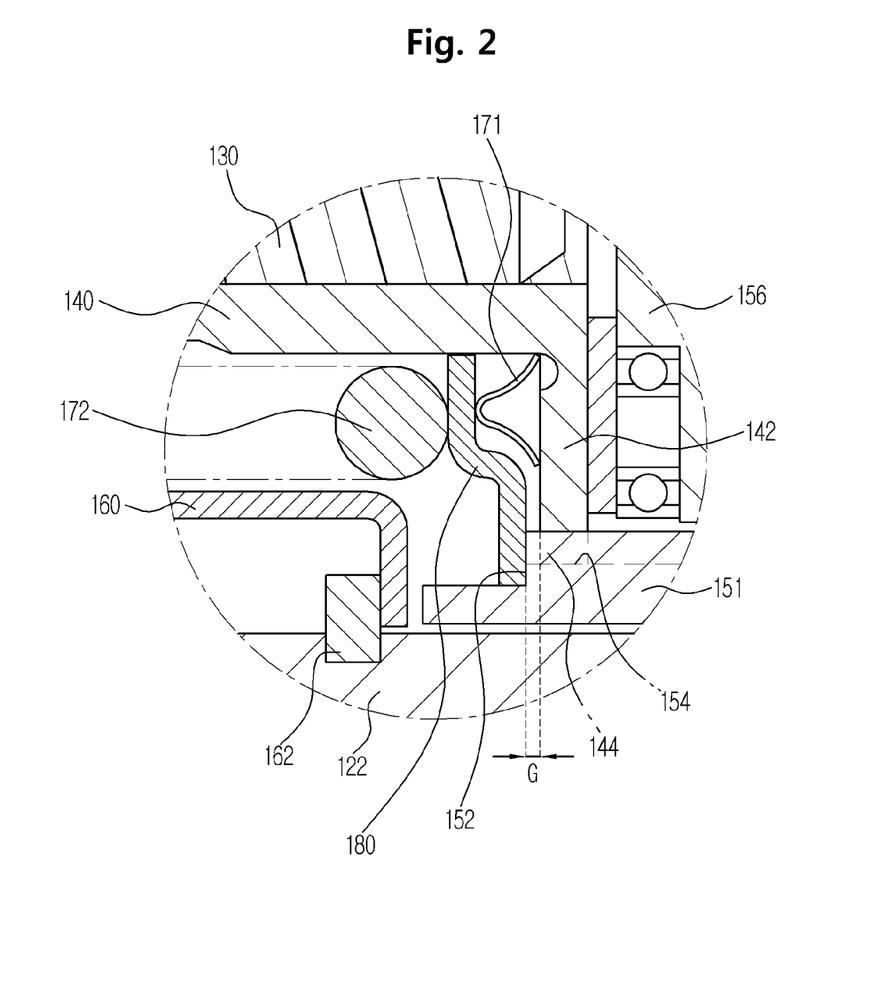
FIG. 2 is an enlarged view illustrating a gap formed between a push rod and a support plate provided in the disc brake according to an embodiment of the present invention.
Figure 3:
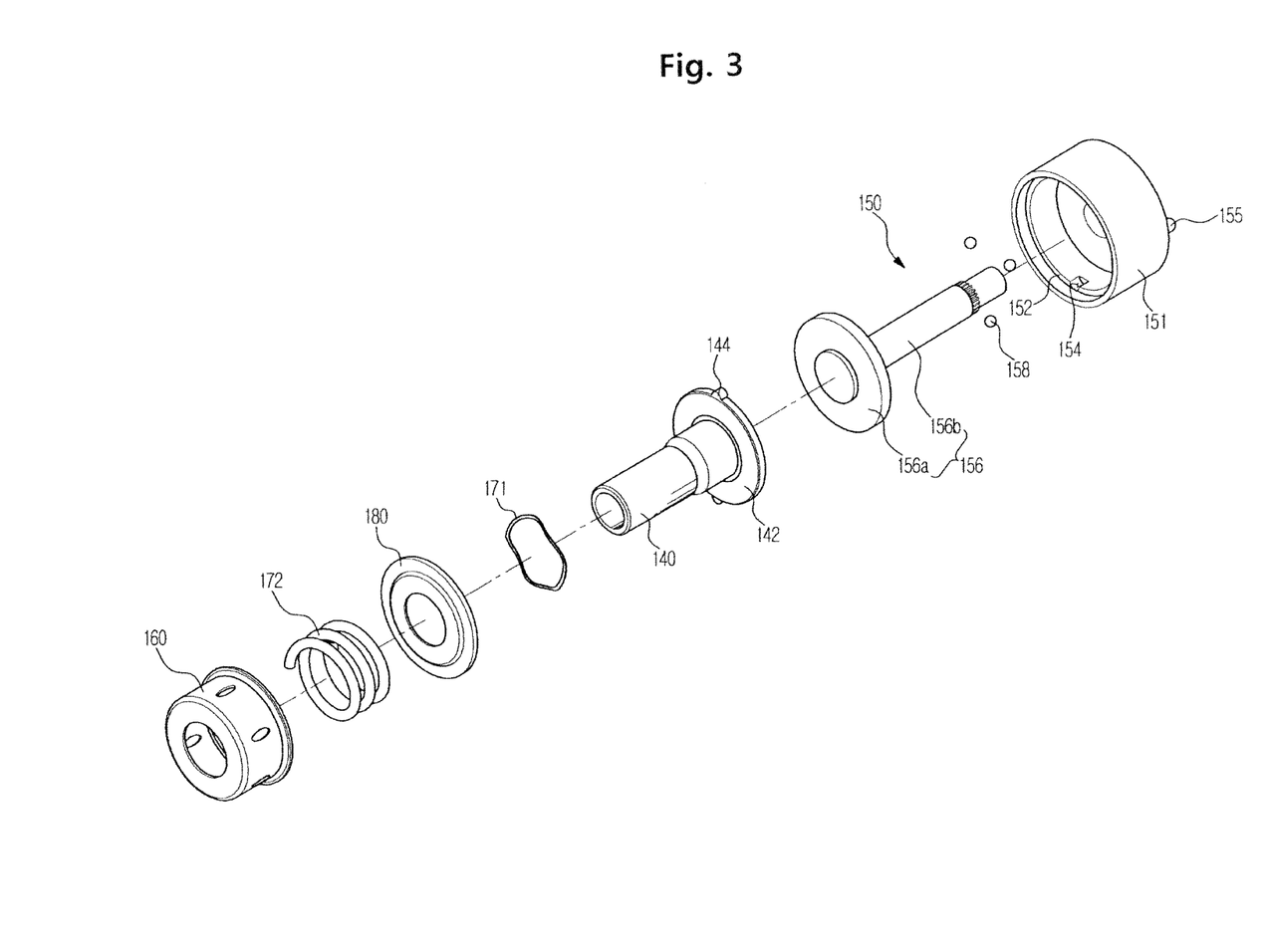
FIG. 3 is a partial perspective view illustrating a state of having a push rod, a first elastic member, a second elastic member and a ramp unit provided in the disc brake being installed.

FIG. 1 is a cross sectional view illustrating a disc brake according to an embodiment of the present invention, FIG. 2 is an enlarged view illustrating a gap formed between a push rod and a support plate provided in the disc brake disc brake according to an embodiment of the present invention, and FIG. 3 is a partial 발췌 perspective view illustrating a state of having a push rod, a first elastic member, a second elastic member and a ramp unit provided in the disc brake being installed.

Referring to FIGS. 1 to 3, a disc brake 100 includes a caliper housing 120 on which a piston 123 is installed to be reciprocated by a hydraulic braking pressure, a carrier 110 fixed to a vehicle body and to which the caliper housing 120 is slidably coupled, one pair of pad pates 111 and 112 installed on the carrier 110 and spaced apart from each other by a predetermined interval so as to be slid toward a disc D, which rotates together with a wheel (not shown) to compress the disc D, an adjuster 130 preventing the pad plates 111 and 112 from moving away from the disc D and allowing the pad plates 111 and 112 to maintain a predetermined interval all the times, a push rod 140 screw-coupled to the adjuster 130, a ramp unit 150 supporting the push rod 140 installed on a cylinder 122 of the caliper housing 120 to prevent rotation of the push rod 140, a spring case 160 forming a predetermined accommodation space between an inner surface of the cylinder 122 and the push rod 140, a first elastic member 171 and a second elastic member 172 provided on the spring case 160, and a support plate 180 supported at an end portion of the ramp unit 150 and interposed between the first and second elastic members 171 and 172.

The carrier 110 is fixed to a knuckle of the vehicle body through a mounting bolt (not shown), and the caliper housing 120 is slidably coupled to both end portions of the carrier 110 through a guide rod (not shown). In addition, the one pair of pad plates 111 and 112 is mounted at the center portion of the carrier 110 and spaced apart from each other so as to be slidable in the directions facing each other.

The one pair of pad plates 111 and 112 are disposed to make contact with a piston 123, which will be to be described below, and divided into an inner pad plate 111 provided with a friction pad 113 attached to an inner side surface thereof and an outer pad plate 112 disposed to make contact with a finger 121, which will be described below, and provided with a friction pad 114 attached to an inner side surface thereof. The disc D is formed in a shape of a circular plate rotating together with a wheel (not shown), and rotates with a portion thereof interposed between the pad plates 111 and 112.

The caliper housing 120 includes the finger 121 to operate the outer pad plate 112 and the cylinder 122 in which the piston 123 is mounted so as to be slidable by hydraulic brake pressure. In this case, a hydraulic duct (not shown) is formed at one end portion of the caliper housing 120 to receive hydraulic brake pressure from the cylinder 122.

The finger 121 is formed to bend downward from the front portion of the caliper housing 120 to surround the outer pad plate 112 at the outside of the outer pad plate 112. Accordingly, when braking is applied, the caliper housing 120 is slidably moved rightward from the carrier 110 by a reaction force according to movement of the piston 123 to cause the outer pad plate 112 to be pushed toward the disc D and pressed against the disc D by the finger 121.

The cylinder 122 is arranged at the rear side of the caliper housing 120 to allow hydraulic brake pressure generated in a master cylinder (not shown) to be transferred, and the piston 123 is installed in the cylinder 122 to be movable forward and backward. That is, the piston 123 installed in the cylinder 122 is moved forward and backward within the cylinder 122 by the hydraulic brake pressure. Installed in the cylinder 122 are the push rod 140 and the ramp unit 150, which will be described below.

The piston 123 is provided in a shape of a cup having one opened side. A head portion 133 of the adjuster 130, which will be described later, is inserted into the inner central portion of the piston 124 to contact the piston 123.

The adjuster 130 includes the head portion 133 installed in the piston 124 inserted into the cylinder 122 to contact the piston 123, and a rod 134 extending from the head portion 133 and provided with threads on the outer circumferential surface thereof. As described above, the head portion 131 is inserted into the piston 124 through the open portion of the piston 124 to contact the piston 124.

Such an adjuster 130, which serves to prevent the clearance between the disc D and the pad plates 111 and 112 from expanding as the friction pads 113 and 114 attached to the pad plates 111 and 112 wear out and to maintain a constant distance therebetween, has washers 128 and 138 installed respectively at the inner lateral surface of the piston 123 and the rear wall of the head portion 133, and a washer spring 139 is arranged between the washers 128 and 138. That is, since the adjuster 130 is provided to contact the piston 123 by an elastic force of the washer spring 139 installed between the inner lateral surface of the piston 123 and the hear portion 133. Therefore, as the washer spring 139 presses the adjuster 130 toward the leading end of the piston 123, the adjuster 130 is kept in contact with the piston 123 even when the friction pads 113 and 114 of the pad plates 111 and 112 are worn out due to friction with the disc D to cause the position of the piston 124 to be shifted toward the inner pad plate 111.

The push rod 140 installed in the cylinder 122 is screw-coupled to the rear side of the adjuster 130, i.e., the rod 132. Thereby, when the piston 123 is moved forward by hydraulic brake pressure, the adjuster 130 coupled with the piston 123 is moved forward together with the piston 123, and the push rod 140 screw-coupled with the adjuster 130 is also moved forward. Thereby, the distance between the threads of the adjuster 130 and the push rod 140 screw-coupled with each other decreases. That is, a gap that is generally present between the threads of the adjuster 130 and the push rod 140 is reduced as the adjuster 130 is arranged to be pressed in the direction of forward movement of the piston 124 (leftward), and thereby the adjuster 130 and the push rod 140 simultaneously move.

The push rod 140 is formed to have a hollow core and threads arranged on the inner circumferential surface thereof to be screw-coupled to the adjuster 130. In addition, provided at the rear portion of the push rod 140 is a flange 142 extending toward the inner circumferential surface of the cylinder 122. The push rod 140 is supported the ramp unit 150, which will be described below, and is prevented from rotating.

As the push rod 140 is screw-coupled with the adjuster 130 and rotation thereof is prevented, the adjuster 130 is movable in the longitudinal direction of the push rod 140. That is, when the piston 123 moves due to wear of the friction pads 113 and 114, the adjuster 130, which is caused to closely contact the piston 123 by the washer spring 139, rotates to move from the push rod 140 by the traveling distance of the piston 123 to remain in close contact with the piston 123. Thereby, the distance between the disc D and the pad plates 111 and 112 to which pressure is applied by the piston 123 is kept constant.

Meanwhile, the flange 142 of the push rod 140 is provided with a plurality of coupling protrusions 144 protruding outward and equally spaced along the outer circumferential surface of the flange 142. As the coupling protrusions 144 are fitted into coupling grooves 154 formed at a fixed ramp plate 151 of the ramp unit 150, the push rod 140 is coupled to the ramp 150 and rotation thereof is prevented.

The ramp unit 150 includes the fixed ramp plate 151 fixedly installed on the cylinder 122, a rotating ramp plate 156 rotated by receiving a rotary force of an operating lever 157 connected to a parking cable (not shown), and a plurality of balls 158 interposed between the fixed ramp plate 151 and the rotating ramp plate 156.

The fixed ramp plate 151 is provided in the form of a cylinder having a front portion thereof open. The flange 142 of the push rod 140 is positioned in the fixed ramp plate 151. As described above, formed in the fixed ramp plate 151 is the coupling groove 154 into which the coupling protrusion 144 is inserted. In addition, a seating groove 152 is recessed inward at a leading end surface of the open front portion of the fixed ramp plate 151. The support plate 180, which will be described below, is supported by being mounted on the seating groove 152. The seating groove 152 is recessed from the inner surface of the fixed ramp plate 151 deeper than the coupling groove 154.

Meanwhile, the fixed ramp plate 151 is installed in the cylinder 122 and rotation thereof is prevented. As shown in the drawings, the fixed ramp plate 151 is provided at a rear portion thereof with a rotation preventing protrusion 155 protruding outward, and a rotation preventing groove 125 corresponding to the rotation preventing protrusion 155 is formed at a position in the cylinder 122 corresponding to the rotation preventing protrusion 155. As the rotation preventing protrusion 155 is inserted into the rotation preventing groove 125, rotation of the fixed ramp plate 151 is prevented, and rotation of the push rod 140 coupled to the fixed ramp plate 151 is also prevented.

The rotating ramp plate 156 includes a shaft part 156*b* protruding outward of the caliper housing 120 by passing through a rear side of the fixed ramp plate 151 and a rear side of the cylinder 122, and a pressing part 156*a* provided in the fixed ramp plate 151 and radially extending from an end portion of the shaft part 156. The shaft part 156*b* protruding outward of the caliper housing 120 is coupled to the operating lever 157 connected to the parking cable (not shown), so as to be rotated by receiving a rotary force through the operating lever 157.

The plurality of balls 158 are interposed between opposite surfaces of the fixed ramp plate 151 and the rotating ramp plate 156 which face each other, and a guide groove (not shown) is formed on the opposite surfaces to support the plurality of balls 158. The guide groove is slantingly formed, and as the balls 158 move along the sloping guide groove according to rotation of the rotating ramp plate 156, the rotating ramp plate 156 is linearly moved. The configuration of allowing the rotating ramp plate 156 to linearly move is generally known in the art, and detailed description will be omitted.

The spring case 160 is arranged to form a predetermined accommodation space between the push rod 140 and the inner lateral surface of the cylinder 122. Specifically, one end of the spring case 160 is fixed to the inner lateral surface of the cylinder 122 by a snap ring 161. Formed in the spring case 160 are the first and second elastic members 171 and 172 configured to return the support plate 180 to the original position thereof to return the piston 123. The first and second elastic members 171 and 172 are disposed in series with each other, and the support plate 180 is disposed between the first and second elastic members 171 and 172. In this case, the support plate 180 is seated on the seating groove 152 of the fixed ramp plate 151 as described above to support the first and second elastic members 171 and 172 provided at opposite sides of the support plate 180. The support plate 180 has a stepped portion at a center thereof to stably support the first elastic member 171.

The first elastic member 171 is formed using a low-pressure spring having one end thereof supported by the support plate 180 and the other end thereof supported by the flange 142 to provide an elastic force in a moving direction of the piston 123. In addition, the second elastic member 172 is formed using a high-pressure spring having one end thereof supported by the other side of the spring case 160 and the other end thereof supported by the support plate 180 to provide an elastic force in the moving direction of the piston 123. The second elastic member 172 has an elastic force greater than an elastic force of the first elastic member 171.

Meanwhile, in order to prevent the overall length of the disc brake 100 as a result of disposing the first elastic member 171 and the second elastic member 172 in series with each other, the first elastic member 171 may be formed using a wave spring or a disc spring having a length shorter than that of a general coil spring. Accordingly, even if the first and second elastic members 171 and 172 are disposed in series with each other, the overall length of the disc brake 100 is minimized.

According to one embodiment of the present invention, a leading end surface of the seating groove 152 is formed ahead of a leading end surface of the flange 142 in an advancing direction of the piston 123. That is, the leading end surface of the flange 142 and the leading end surface of the seating groove 152 are provided to form a step. Accordingly, a gap having a size corresponding to the step is formed between the support plate and the flange.

Figure 4:
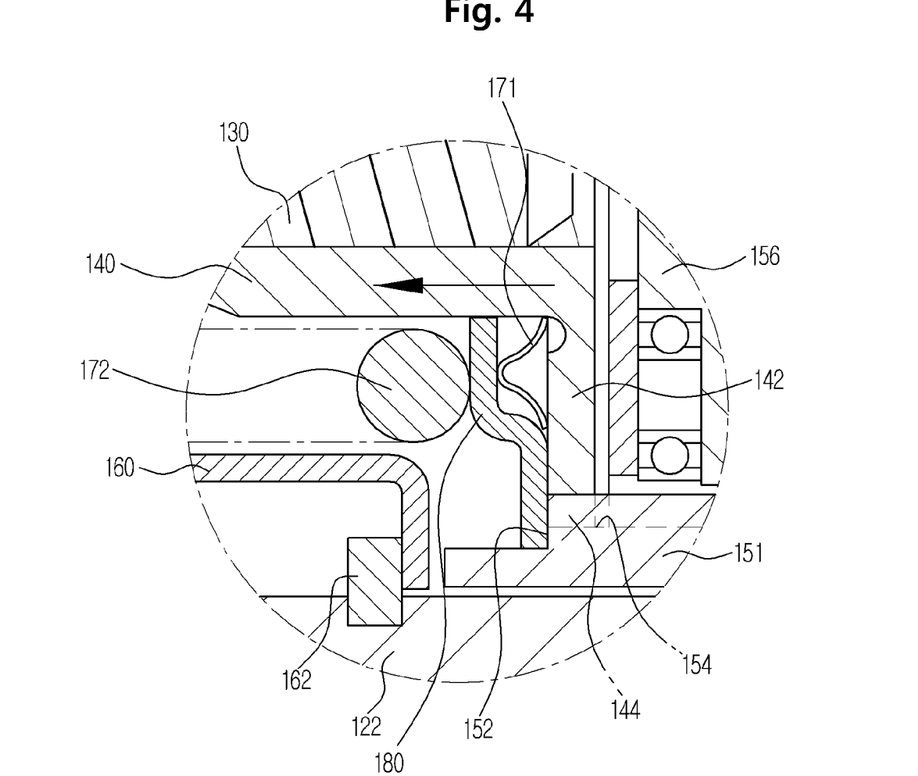
FIGS. 4 and 5 are views illustrating an operation state of the disc brake according to an embodiment of the present invention.
Figure 5:
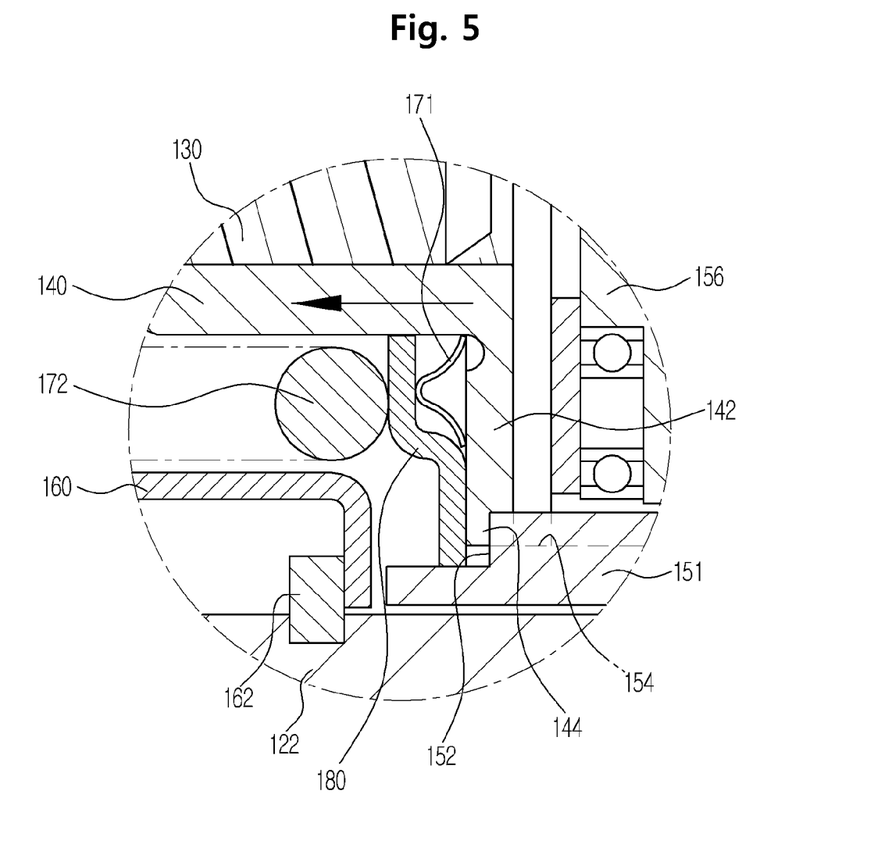

As the structure to support the first elastic member 171 and the second elastic member 172 is provided as above, the first elastic member 171 is supported by the flange 142, and the second elastic member 172 is supported by the support plate 180 when the disc brake 100 does not operate. When the braking is applied and the adjuster 130 and the push rod 140 are moved according to movement of the piston 123, the first elastic member 171 supported by the flange 142 of the push rod 140 is first compressed as shown in FIG. 4 by a distance corresponding to the gap G. As the first elastic member 171 is compressed by the distance corresponding to the gap G, the flange 142 contacts the support plate 180 as shown in FIG. 5, and thus the flange 172 and the support plate 180 move together. That is, the second plate 180 supports the second elastic member 172, and the first elastic member 171 and the second elastic member 172 are compressed. This is because the second elastic member 172 has an elastic force greater than that of the first elastic member 171.

Hereinafter, operation of the disc brake 100 as above will be described.

The disc brake 100 according to the illustrated embodiment is first installed at a vehicle. That is, the gap G is formed between the flange 142 of the push rod 140 and the support plate 180 supported by the ramp unit 150, and thereby a running clearance between the disc D and the pad plates 111 and 112 is secured.

When the brake is applied in this state, hydraulic brake pressure is introduced into the cylinder 122, causing the piston 123 to apply pressure to the inner pad plate 111. Thereby, the friction pad 113 attached to the inner pad plate 111 is pressed against the disc D. At the same time, the caliper housing 120 slides from the carrier 110 according to reaction force, and thereby the finger 121 applies pressure to the outer pad plate 112, causing the friction pad 114 attached to the outer pad plate 112 to be pressed against the disc D to generate braking force.

Meanwhile, as the piston 123 moves, the adjuster 130 adjoining the piston 123 and the push rod 140 coupled to the adjuster 130 move together. At this time, the push rod 140 moves to compress only the first elastic member 171 supported by the flange 142. That is, as shown in FIG. 4, the push rod 140 moves a distance corresponding to the gap G between the push rod 140 and the support plate 150 to compress the first elastic member 171. Further, once the push rod 140 moves by the gap G, the flange 142 contacts the support plate 180, and then the push rod 140 and the support plate 180 move together (see FIG. 5). That is, both the first elastic member 171 and the second elastic member 172 are compressed. When the push rod 140 moves, rotation thereof is limited by the coupling protrusion 144 coupled to the coupling groove 154 of the fixed ramp plate 151 and movement thereof is guided with respect to the fixed ramp plate 151.

Additionally, as the first elastic member 171 and the second elastic member 172 are implemented using the lower pressure spring and the high pressure spring, respectively, and disposed in series with each other while interposing the support plate 180 therebetween so that the first elastic member 171 and the second elastic member 172 may be operable at a low pressure and a high pressure, respectively. That is, at low pressure, the push rod 140 moves only a distance corresponding to the gap G. At high pressure, the push rod 140 engages and moves with the support plate 180.

After braking is completed, the push rod 140 and the support plate 180 are returned to original positions thereof by the second elastic member 172 and the first elastic member 171, and thereby the piston 123 smoothly moves backwards without suffering drag. Once the support plate 180 is caused to contact the seating groove 152 of the fixed ramp plate 151 by the second elastic member 172, the first elastic member 171 finally moves the push rod 140 by a distance corresponding to the gap G to return the push rod 140 to the original position thereof. In addition, since the adjuster 130 screw-coupled to the push rod 140 and the piston 123 return to original positions thereof, the effect of return of the piston 123 is enhanced. Thereby, the initial clearance between the disc D and the friction pads 113 and 114 is maintained. In addition, in a case when the friction pads 113 and 114 are worn out as a result of braking, the clearance between the disc D and the pad plates 111 and 112, that is, between the disc D and the friction pads 113 and 114 is automatically adjusted by the adjuster 130.

Meanwhile, the rotating ramp plate 156 of the ramp unit 150 is rotated by the operating lever 157 connected to the parking cable (not shown), the rotating ramp plate 156 is moved forward by the balls 158 while rotating, to compress the push rod 140. Accordingly, the adjuster 130 screw-coupled to the push rod 140 is moved together, and the piston 123 making contact with the adjuster 130 moves forward together, to cause the inner pad plate 111 to be pressed against the disc D, thereby generating a braking force. In this case, the first and second elastic members 171 and 172 are compressed by the compression of the push rod 140, and when the external force applied to the operating lever 157 is released, the piston 123, the adjuster 130 and the push rod 140 are returned to original positions thereof by the first and second elastic members 171 and 172.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A disc brake comprising a carrier on which a pair of pad plates are movably installed and a caliper housing, which is slidably installed on the carrier and is provided with a cylinder having a piston mounted so as to move forward and backward by a hydraulic braking pressure, the disc brake comprising:
   an adjuster installed in the piston to prevent the pad plates from moving away from a disc and to maintain the pad plates at a constant distance from the disc;
   a push rod installed in the cylinder, a front portion thereof being screw-coupled to the adjuster and a rear portion thereof being provided with a flange extending toward an inner circumferential surface of the cylinder;
   a ramp unit into which the rear portion of the push rod is inserted and which is installed in the cylinder and compresses the push rod toward the piston in cooperation with a parking cable to prevent rotation of the push rod;
   a spring case having an end portion of one side thereof fixed to the cylinder and forming a predetermined accommodation space between the inner circumferential surface of the cylinder and the push rod;
   a first elastic member and a second elastic member arranged in series with each other in the accommodation space of the spring case to provide elastic force to the push rod; and
   a support plate supported by an end portion of the ramp unit and interposed between the first elastic member and the second elastic member.

2. The disc brake of claim 1, wherein the ramp unit comprises:
   a fixed ramp plate provided in a cylindrical shape, a front portion of which is open, and is fixedly installed on the cylinder;
   a rotating ramp plate provided in the fixed ramp plate and passing through a rear portion of the fixed ramp plate and a rear portion of the cylinder, to rotate by receiving a rotatory force of an operating lever connected to the parking cable; and
   a plurality of balls interposed between the fixed ramp plate and the rotating ramp plate to advance the rotating ramp plate at the time of rotation of the rotating ramp plate.

3. The disc brake of claim 2, wherein:
   the fixed ramp plate is provided at the rear portion thereof with a rotation preventing protrusion that protrudes outward; and
   a rotation preventing groove corresponding to the rotation preventing protrusion is formed at a position in the cylinder corresponding to the rotation preventing protrusion.

4. The disc brake of claim 2, wherein:
   the push rod is provided with a plurality of coupling protrusions protruding outward and equally spaced along an outer circumferential surface of the flange; and
   the fixed ramp plate is provided at a position of an inner circumferential surface thereof corresponding to the coupling protrusions with coupling grooves assembled to the coupling protrusions to prevent rotation of the push rod.

5. The disc brake of claim 2, wherein:
   the support plate is supported by being seated and supported on a seating groove that is recessed inward at a leading end surface of a front side of the fixed ramp plate; and
   a leading end surface of the seating groove is formed ahead of a leading end surface of a flange in an advancing direction of the piston to form a step between the leading end surface of the flange and the leading end surface of the seating groove, thereby forming a gap in a longitudinal direction between the support plate and the flange.

6. The disc brake of claim 1, wherein:
   the first elastic member includes a low-pressure spring having one end supported by the support plate and the other end supported by the flange to provide an elastic force in a movement direction of the piston; and
   the second elastic member includes a high-pressure spring having one end supported by the other side of the spring case and the other end supported by the support plate to provide an elastic force in a movement direction of the piston,
   wherein the high-pressure spring has an elastic force greater than an elastic force of the lower pressure spring.

7. The disc brake of claim 6, wherein the first elastic member includes a wave spring or a disc spring.

8. The disc brake of claim 1, wherein:
   the adjuster is provided with a head portion making contact with the piston and a rod extending rearward from the head portion and provided at an outer circumferential surface thereof with a thread that is screw-coupled to the push rod; and
   washers are installed on a rear wall of the head portion of the adjuster and an inner side surface of the piston, respectively, and a washer spring is provided between the washers such that the adjuster comes into close contact with the piston by an elastic force of the washer spring.

* * * * *